US 11,658,556 B2

(12) United States Patent
Owens

(10) Patent No.: US 11,658,556 B2
(45) Date of Patent: May 23, 2023

(54) ENERGY GENERATION

(71) Applicant: PHAANIX PTY LTD, Newtown (AU)

(72) Inventor: Daniel Owens, Newtown (AU)

(73) Assignee: PHAANIX PTY LTD, Newtown (AU)

( * ) Notice: Subject to any disclaimer, the term of this patent is extended or adjusted under 35 U.S.C. 154(b) by 0 days.

(21) Appl. No.: 17/276,341

(22) PCT Filed: Sep. 20, 2019

(86) PCT No.: PCT/AU2019/051005
§ 371 (c)(1),
(2) Date: Mar. 15, 2021

(87) PCT Pub. No.: WO2020/056464
PCT Pub. Date: Mar. 26, 2020

(65) Prior Publication Data
US 2022/0045593 A1 Feb. 10, 2022

(30) Foreign Application Priority Data
Sep. 20, 2018 (AU) .................. 2018903528

(51) Int. Cl.
*H02K 35/02* (2006.01)
*H02K 49/10* (2006.01)
*H02K 11/01* (2016.01)

(52) U.S. Cl.
CPC ........... *H02K 49/106* (2013.01); *H02K 11/01* (2016.01)

(58) Field of Classification Search
CPC .... H02K 35/02; H02K 49/104; H02K 49/106; H02K 49/108
See application file for complete search history.

(56) References Cited

U.S. PATENT DOCUMENTS

| 5,594,289 A | 1/1997 | Minato |
| 6,930,421 B2 * | 8/2005 | Wise ............... H02K 7/025 310/46 |

(Continued)

FOREIGN PATENT DOCUMENTS

| CN | 107181387 | 9/2017 |
| EA | 200801695 | 8/2009 |
| WO | 2017/205970 | 12/2017 |

OTHER PUBLICATIONS

International Preliminary Report on Patentability dated Mar. 23, 2021 for Corresponding PCT Application No. PCT/AU2019/051005.

(Continued)

*Primary Examiner* — Dang D Le
(74) *Attorney, Agent, or Firm* — Duane Morris LLP

(57) ABSTRACT

An energy generation apparatus includes a first element including at least one first magnet and a second element including at least one second magnet. The second element is movable with respect to the first element. The at least one first magnet and the at least one second magnet are oriented such that common poles of the at least one first and second magnets are temporarily in proximity to each other such that a repulsive magnetic force between the at least one first magnet and at least one second magnet causes relative motion between the first and second elements. Preferred embodiments of the apparatus include at least one positioning element or cam including an undulating or wave-like surface to control a position and/or an orientation of the at least one first magnet and/or the at least one second magnet.

22 Claims, 6 Drawing Sheets

(56) References Cited

U.S. PATENT DOCUMENTS

| | | | | |
|---|---|---|---|---|
| 7,291,953 B1* | 11/2007 | Smith | ............. | H02K 41/03 |
| | | | | 310/191 |
| 7,922,464 B2* | 4/2011 | Adachi | ............. | F04D 13/027 |
| | | | | 310/104 |
| 8,492,936 B1* | 7/2013 | Waters | ............. | H02K 35/02 |
| | | | | 310/20 |
| 9,013,081 B2* | 4/2015 | Atallah | ............. | H02K 7/11 |
| | | | | 310/104 |
| 2007/0120432 A1 | 3/2007 | Vaden et al. | | |
| 2008/0024017 A1* | 1/2008 | Chen | ............. | H02K 53/00 |
| | | | | 310/152 |
| 2017/0033645 A1 | 2/2017 | McCartney | | |

OTHER PUBLICATIONS

Thirumalairaj et al.; "Electric Power Generation by Using Magnetic Repulsive Force"; International Journal of Innovative Research in Science, Engineering and Technology; vol. 6, Issue 11, Nov. 2017.
Written Opinion issued in PCT/AU2019/051005, dated Nov. 21, 2019.

* cited by examiner

ENERGY GENERATION

FIELD OF THE INVENTION

The present invention relates to energy generation. In particular, embodiments of the present invention relate to systems, methods and apparatus for energy generation, in particular comprising magnets.

BACKGROUND TO THE INVENTION

There is a continued search for new systems, methods and apparatus for energy generation to meet the world's increasing energy demands and to generate energy in a more sustainable, environmentally friendly manner. Solar, wind, wave, tidal, hydroelectric and geothermal energy generation systems, methods and apparatus have been developed as some renewable approaches to energy generation which are replacing some traditional methods of energy generation including such methods that rely on fossil fuels. However, new energy generation systems, methods and apparatus are required to supplement existing renewable systems, methods and apparatus in an effort to reduce reliance on fossil fuels and to curtail harmful emissions and environmental damage.

OBJECT OF THE INVENTION

A preferred object of the present invention is to provide systems and/or methods and/or apparatus for energy generation that address or at least ameliorate one or more of the aforementioned problems and/or provide a useful commercial alternative.

SUMMARY OF THE INVENTION

The present invention concerns systems, methods and apparatus for energy generation, in particular comprising a configuration or arrangement of magnets that create motion, such as, but not limited to rotational, linear or oscillating motion between two or more elements.

According to one aspect, but not necessarily the broadest aspect, the present invention is directed to an energy generation apparatus comprising:
 a first element comprising at least one first magnet;
 a second element comprising at least one second magnet, the second element movable with respect to the first element;
 wherein the at least one first magnet and the at least one second magnet are oriented such that common poles of the first and second magnets are temporarily in proximity to each other such that a repulsive magnetic force between the at least one first magnet and at least one second magnet causes relative motion between the first element and the second element.

Suitably, the repulsive magnetic force causes the second element to move with respect to the first element or the first element to move relative to the second element or both the first and second elements to move.

In some embodiments, the second element is rotatable with respect to the first element such that when common poles of the at least one first magnet and the at least one second magnet are temporarily in proximity to each other, the repulsive magnetic force causes the second element to rotate with respect to the first element.

In some embodiments, the second element exhibits reciprocating linear motion with respect to the first element such that when common poles of the at least one first magnet and the at least one second magnet are temporarily in proximity to each other, the repulsive magnetic force causes the second element to move linearly with respect to the first element.

Suitably, the first element comprises a plurality of first magnets.

Suitably, the second element comprises a plurality of second magnets.

Suitably, the magnets of the plurality of first magnets are spaced apart on the first element. In some embodiments, the first magnets are spaced equal distances apart, or substantially equal distances apart. In a preferred embodiment, the first magnets are spaced equal distances, or substantially equal distances about a perimeter of the second element, such as a circumference of a circular path on the first element.

Suitably, the magnets of the plurality of second magnets are spaced apart on the second element. In some embodiments, the second magnets are spaced equal distances apart, or substantially equal distances apart. In a preferred embodiment, the second magnets are spaced equal distances, or substantially equal distances about a perimeter of the second element, such as a circumference of a circular path on the second element.

Suitably, the north poles of the at least one first magnet and the at least one second magnet are temporarily in proximity to each other.

Suitably, the south poles of the at least one first magnet and the at least one second magnet are temporarily in proximity to each other.

Suitably, the at least one first magnet is mounted to the first element and the at least one second magnet is mounted to the second element in an orientation to maximise the magnetic repulsive force in a direction of motion of the second element. In some embodiments, the at least one first and second magnets are mounted to the first and second elements respectively to maximise rotational velocity of the second element.

Suitably, the first element is fixed.

Suitably, the second element is mounted on at least one frictionless bearing.

In some embodiments, the second element is spaced apart from the first element. Suitably, the apparatus comprises an air gap between the first and second elements. More preferably, the apparatus comprises a vacuum between the first and second elements.

In some embodiments, the energy generation apparatus comprises a magnetic shield element between the at least one first magnet mounted to the first element and the at least one second magnet mounted to the second element, the magnetic shield element comprising at least one aperture or opening therein at or around a location at which the at least one first magnet and the at least one second magnet is aligned.

In some embodiments the energy generation apparatus comprises at least one positioning element, or cam to control a position and/or an orientation of the at least one first magnet and/or the at least one second magnet.

Suitably, the at least one positioning element, or cam controls a position and/or an orientation of the at least one second magnet mounted to the second element.

Preferably, the at least one positioning element comprises an undulating or wavelike surface and in particular a surface with sinusoidal surface variations comprising multiple lobes and troughs to move the at least one second magnet closer to the at least one first magnet when the magnets are temporarily in proximity to each other and further away from each other at other times.

Suitably, the positioning element or cam comprises a central aperture to receive the second element therein.

Suitably, the positioning element or cam is fixed below the second magnets such that undersides of the second magnets rest on the undulating or wavelike surface.

Suitably, the second magnets are movably mounted by a flexible arm, a hinge or the like such that as the second element rotates relative to the first element due to the repulsive magnetic force between the first and second magnets, the second element 16 rotates relative to the positioning element or cam causing the second magnets to move up and down as they pass over the undulating or wavelike surface of the positioning element or cam.

Suitably, a periodicity of the lobes and troughs of the undulating or wavelike surface coincides with the number and arrangement of magnets such that the second magnets are moved closer to the first magnets when the magnets are temporarily in proximity to each other and further away from each other at other times.

Suitably, an axis of rotation of the second element is variable to allow the second magnets to move closer to the first magnets when the magnets are temporarily in proximity to each other and further away from each other at other times.

Suitably, the second element comprises one or more flexible or hinged arms or levers that pass over one or more raised areas via a bearing or brush to maximise the repulsive forces and minimises the attractive forces of the first and second magnets.

Suitably, the second element comprises one or more pairs of flexible or hinged arms or levers whereby when one of the pair of arms or levers is not being caused to move by the repulsion of two magnets in proximity to each other, the other arm or lever of the same pair of arms or lever is being caused to move by the repulsion of two other magnets in proximity to each other.

Suitably, the apparatus may comprise a pair of spaced apart second elements in the form of rotating discs comprising a plurality of second magnets, a central static disc between the two second elements, and at least one elongate first magnet extending between the two second elements at an angle through the central static disc such that opposite poles of the elongate first magnet are on opposite sides of the second elements.

The apparatus may further comprise at least one converter in communication with the movable second element to convert kinetic energy of the second element into electrical energy. The at least one converter may include a dynamo, a turbine, or a generator.

The electrical energy may be stored, for example, in a rechargeable battery, transmitted to an electrical network or grid, or used by a device in communication with the apparatus or which the apparatus is a part.

According to another aspect, but not necessarily the broadest aspect, the present invention is directed to a method of energy generation comprising using the aforementioned apparatus.

According to another aspect, but not necessarily the broadest aspect, the present invention is directed to a method of energy generation comprising:

mounting at least one first magnet to a first element;

mounting at least one second magnet to a second element, wherein the second element is movable with respect to the first element;

orienting the at least one first magnet and the at least one second magnet such that common poles of the first and second magnets are temporarily in proximity to each other causing a repulsive magnetic force between the at least one first magnet and at least one second magnet to cause relative motion between the first and second elements; and converting kinetic energy of the moving first and/or second elements into electrical energy with at least one converter in communication with the first and/or second element.

Further features and/or aspects of the present invention will become apparent from the following detailed description.

BRIEF DESCRIPTION OF THE DRAWINGS

Embodiments of the present invention will now be described by way of example only with reference to the accompanying drawings in which like reference numerals refer to like features. In the drawings.

Figure 1:
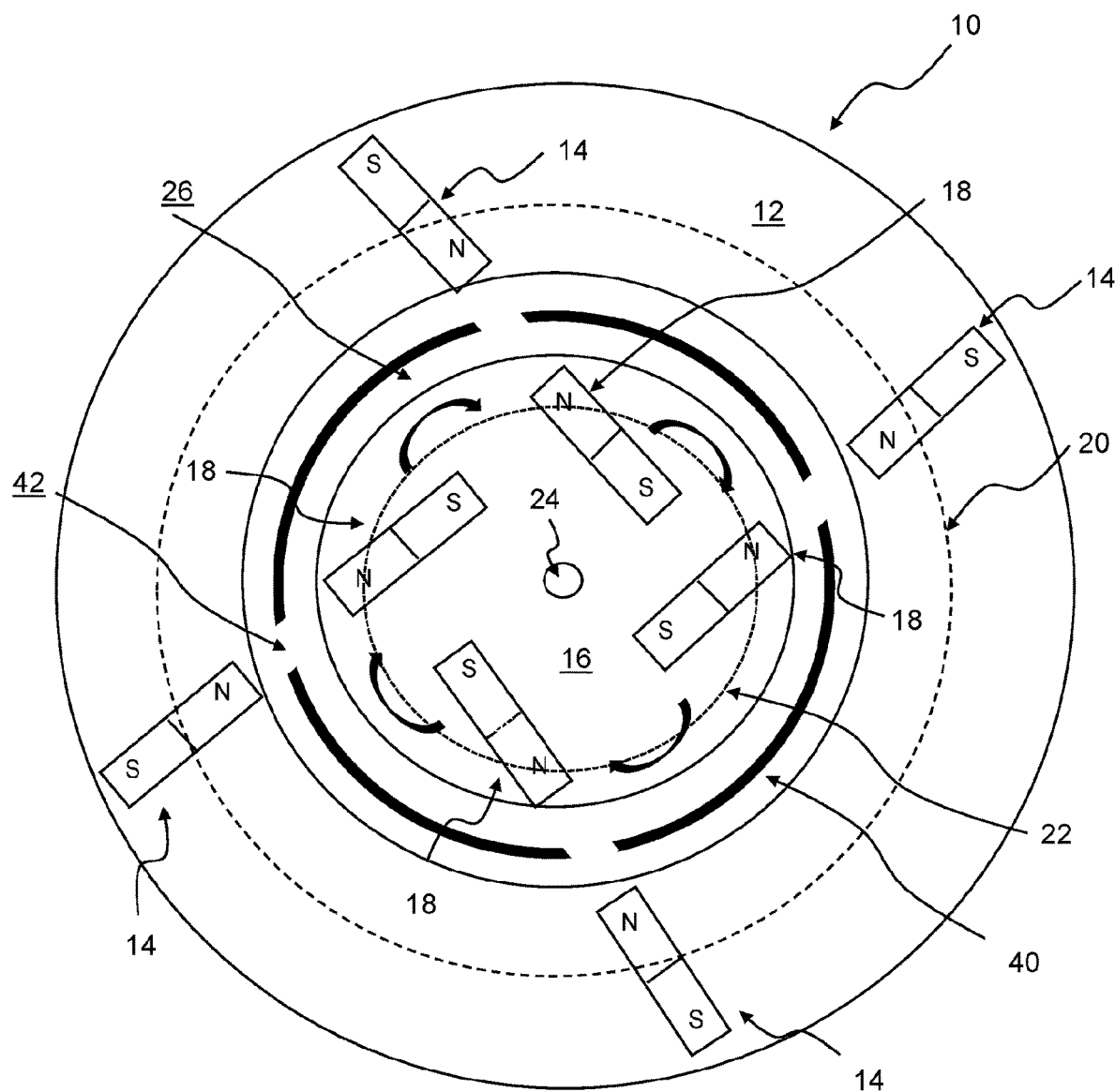
FIG. 1 is a plan view of an energy generation apparatus according to some embodiments of the present invention.

Skilled addressees will appreciate that elements in the drawings are illustrated for simplicity and clarity and have not necessarily been drawn to scale. For example, the relative dimensions of some of the elements in the drawings may be distorted and/or some elements may be omitted to help improve understanding of embodiments of the present invention.

DETAILED DESCRIPTION

Embodiments of the present invention are directed to systems, methods and apparatus for energy generation, in particular comprising a configuration or arrangement of magnets that create motion, such as, but not limited to rotational, linear or oscillating motion.

Reference is made to FIG. 1, which show an energy generation apparatus 10 according to embodiments of the present invention. The energy generation apparatus 10 comprises a first element 12 comprising at least one first magnet 14 and a second element 16 comprising at least one second magnet 18. The second element 16 is movable with respect to the first element 12. The at least one first magnet 14 and the at least one second magnet 18 are oriented such that common poles of the first and second magnets 14, 18 are temporarily in proximity to each other such that a repulsive magnetic force between the at least one first magnet 14 and the at least one second magnet 18 causes relative motion between the first and second elements, and in this embodiment, the second element 16 to move with respect to the first element 12. The orientation of the first and second magnets 14, 18 to cause the relative motion of the first and second elements can be achieved in a variety of ways which will be described herein.

In some embodiments, such as the embodiment shown in FIG. 1, the second element 16 is rotatable with respect to the first element 12 such that when common poles of the at least one first magnet 14 and the at least one second magnet 18 are temporarily in proximity to each other, the repulsive magnetic force between the common poles causes the second element 16 to rotate with respect to the first element 12.

The common poles can be the north poles or the south poles of the magnets Therefore, the repulsive force can be achieved when the north poles of the at least one first magnet 14 and the at least one second magnet 16 are temporarily in proximity to each other. Alternatively, the repulsive force can be achieved when the south poles of the at least one first magnet 14 and the at least one second magnet 18 are temporarily in proximity to each other.

As shown in the embodiment of FIG. 1, the first element 12 comprises a plurality of first magnets 14 and the second element 16 comprises a plurality of second magnets 18. In the embodiment shown in FIG. 1, the first element 12 comprises four first magnets 14 and the second element 16 comprises four second magnets 18. However, fewer or more first and second magnets 14, 18 can be used. In some embodiments, a continuous series of first magnets 14 can be provided on the first element 12 and a continuous series of second magnets 18 can be provided on the second element 16.

With reference to FIG. 1, the magnets of the plurality of first magnets 14 are spaced apart on the first element 12. In some embodiments, the first magnets 14 are spaced equal distances apart, or substantially equal distances apart. In a preferred embodiment, the first magnets 14 are spaced equal distances, or substantially equal distances about a circumference of a first circular path 20 on the first element 12.

As shown in FIG. 1, the magnets of the plurality of second magnets 18 are spaced apart on the second element 16. In some embodiments, the second magnets 18 are spaced equal distances apart, or substantially equal distances apart. In a preferred embodiment, the second magnets 18 are spaced equal distances, or substantially equal distances about a circumference of a second circular path 22 on the second element 16.

It will be appreciated that the present invention is not limited to the first or second elements being circular and therefore in embodiments in which the first and/or second elements are non-circular, the magnets can be mounted to the respective first and/or second elements, for example, about a perimeter of the first and/or second elements.

With reference to FIG. 1, the first magnets 14 are mounted to the first element 12 and the at least one second magnet 18 is mounted to the second element 16 in an orientation to maximise the magnetic repulsive force in a direction of motion of the second element 16. In some embodiments, the at least one first and second magnets 14, 18 are mounted to the first and second elements respectively to maximise rotational velocity of the second element.

In the embodiment shown in FIG. 1, the second magnets 18 are equally spaced on the second element 16 such that all four of the second magnets 18 are simultaneously aligned with the first magnets 14 on the first element 12. Hence, simultaneously, each of the four second magnets 18 is repelled by a respective first magnet 14 on the first element 12 thus maximising the instantaneous magnetic repulsive force and causing rotation of the second element 16 with respect to the first element 12 in a clockwise direction.

It will be appreciated that in the embodiment shown in FIG. 1, the first element 12 is fixed and the second element 16 is rotatable with respect to, or relative to the first element 12.

In other embodiments, the second element 16 is fixed and the first element 12 is rotatable relative to the second element 16. In such an embodiment, the angles and orientation of the magnets may be varied from that shown in FIG. 1.

In some embodiments, it is envisaged that neither the first element 12 nor the second element 16 is fixed and the repulsive magnetic force between the first and second magnets 14, 18 causes both the first and second elements to move.

In the embodiment shown in FIG. 1, the second element 16 is mounted on at least one frictionless bearing 24 to maximise the kinetic energy of the second element 16.

In some embodiments, as shown in FIG. 1, the second element 16 is spaced apart from the first element by a gap 26. The size of the gap 26 will depend on the particular application of the apparatus. In some embodiments of the apparatus 10, the gap 26 comprises an air gap between the first and second elements 12, 16. In some preferred embodiments, the apparatus 10 comprises a vacuum between the first and second elements 12,16 to further reduce friction or drag that may be caused by air currents.

Figure 2:
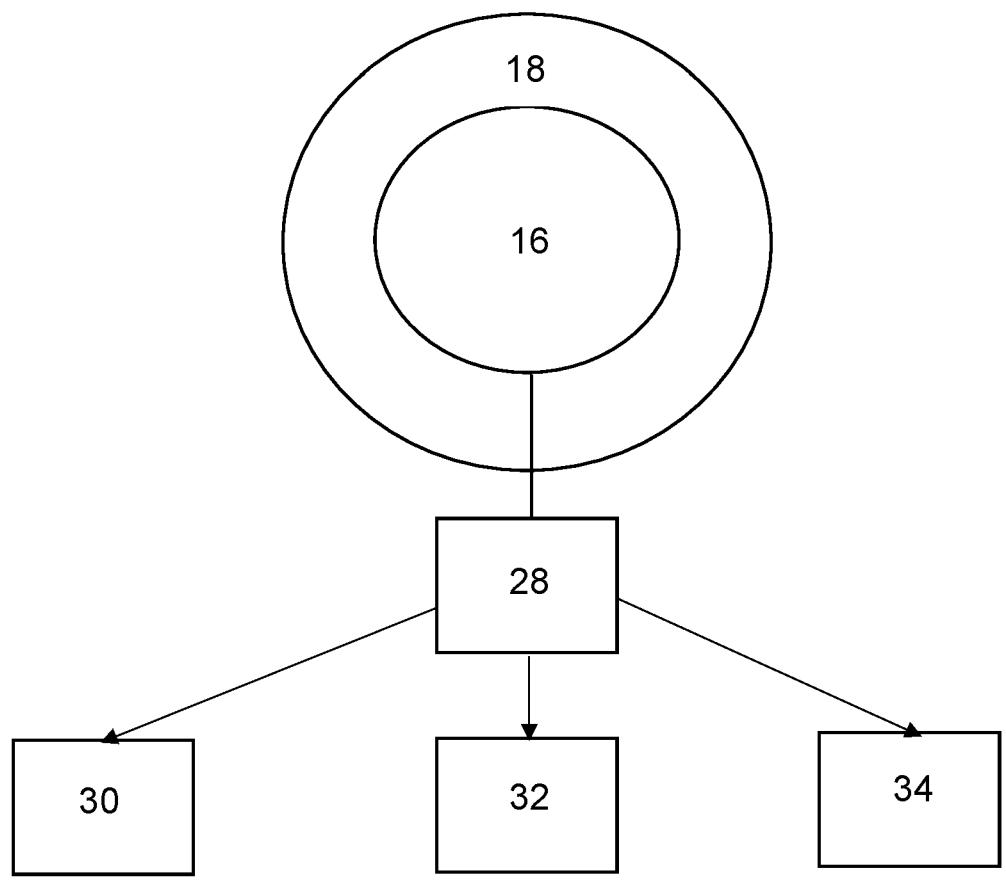
FIG. 2 is a schematic diagram of the apparatus shown in FIG. 1 as part of an energy generation system.

With reference to FIG. 2, the apparatus 10 further comprises at least one converter 28 in communication with the movable second element 16 to convert kinetic energy of the second element 16 into another form of energy, such as electrical energy. The at least one converter 28 can include a dynamo, a turbine, or a generator.

The electrical energy may be stored, for example, in a rechargeable battery 30, transmitted to an electrical network or grid 32, or used by a device 34 in communication with the apparatus or of which the apparatus 10 is a part.

In alternative embodiments, the first and second magnets 14,18 are not all aligned simultaneously. For example, the first and second magnets 14, 18 can be arranged such that at least one first magnet 14 and at least one second magnet 18 are aligned at any one time. In this way, a more constant repulsive force between the first and second magnets 14, 18 can be achieved rather than a pulsing, or temporally varying repulsive force. It should also be appreciated that the present invention is not limited to the first element 12 and the second element 16 comprising the same number of first and second magnets 14, 18 respectively. In some embodiments, the first element 12 can comprise more first magnets 14 than the second element 16 comprises second magnets 18. In some embodiments, the second element 16 can comprise more second magnets 18 than the first element 12 comprises first magnets 18.

It is also envisaged that in some embodiments, the apparatus 10 comprises multiple levels of first and second magnets 14, 18. For example, the first element 12 can comprise a first level of first magnets 14 and a second level of first magnets 14. Correspondingly, the second element 16 can comprise a first level of second magnets 18 and a second level of second magnets 18. The first level of first magnets 14 on the first element 12 align, at least temporarily, with the first level of second magnets 18 on the second element 16 and the second level of first magnets 14 on the first element 12 align, at least temporarily, with the second level of second magnets 18 on the second element 16. The number of levels, the number of magnets and the spacing of the magnets can be selected to determine the strength and time variation of the repulsive forces between the first and second magnets.

In some embodiments, the energy generation apparatus 10 comprises a magnetic shield element 40 between the at least one first magnet 14 mounted to the first element 12 and the at least one second magnet 18 mounted to the second element 16. The magnetic shield element 40 comprises at least one aperture or opening 42 therein at or around a location at which the at least one first magnet 14 and the at least one second magnet 18 are aligned. In the embodiment shown in FIG. 1, magnetic shield element 40 comprises four apertures or openings 42 therein at locations where each pair of first and second magnets 14, 18 are aligned. The magnetic shield element 40 is made of any suitable material which conducts lines of magnetic flux better than the surrounding medium, i.e. has a high magnetic permeability compared with the surrounding medium. Examples of materials that can be suitable for the magnetic shield element 40 include, but are not limited to mu-metal, permalloys and other known materials with a high magnetic permeability. Consequently, the magnetic shield element 40 shields the magnetic field between the first and second magnets 14, 18 when the first and second magnets 14, 18 are not aligned to reduce any resistance caused by any attraction between opposite poles of the magnets 14, 18. The apertures or openings 42 in the magnetic shield element 40 allow the first and second magnets 14, 18 to repel when aligned.

Figure 5:
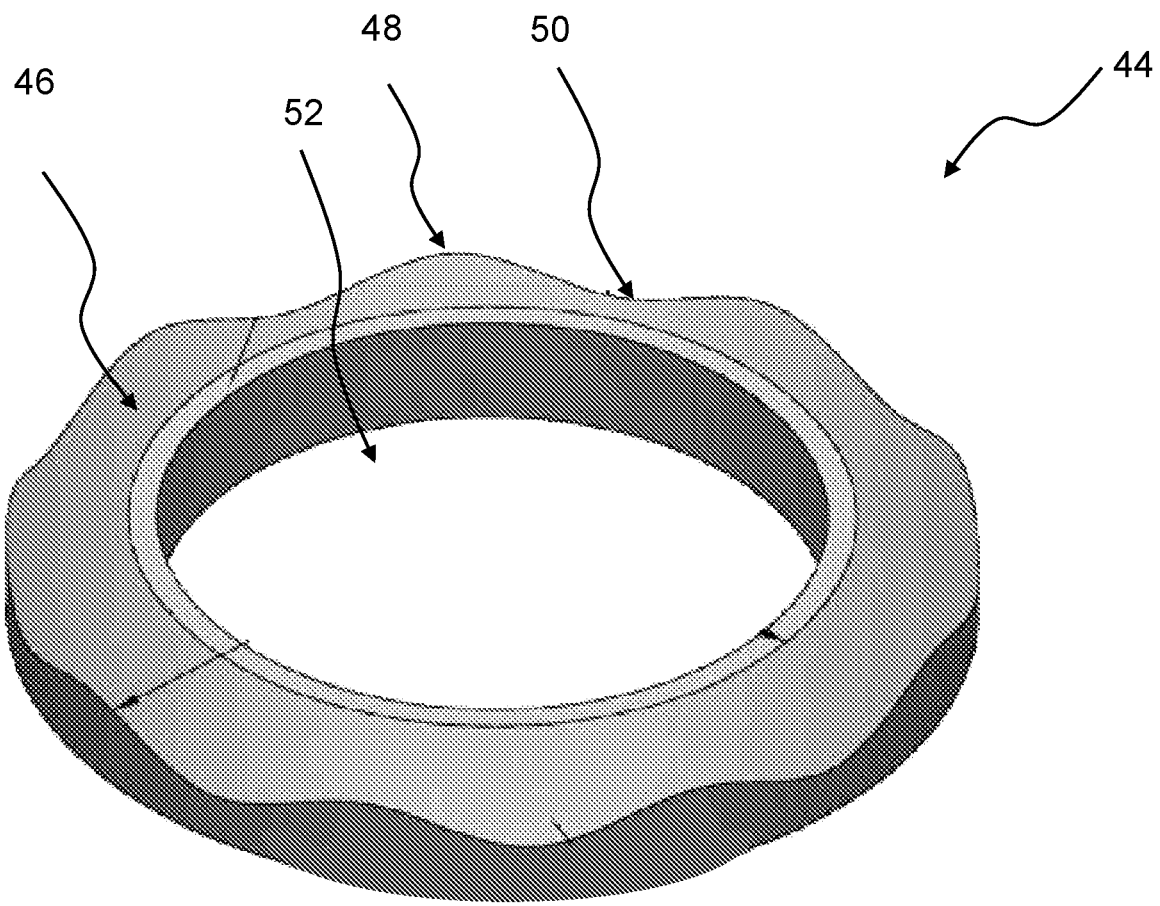
FIG. 5 is a perspective view of a positioning element or cam according to some embodiments of the present invention.

With reference to FIG. 5, in some embodiments, the energy generation apparatus 10 comprises at least one positioning element or cam 44 to control a position and/or an orientation of the at least one first magnet 14 and/or the at least one second magnet 18. In some embodiments, at least one positioning element or cam 44 can control a position and/or an orientation of the at least one second magnet 18 mounted to the second element 16. In some embodiments, at least one positioning element or cam 44 can control a position and/or an orientation of the at least one first magnet 14 mounted to the first element 12. In some embodiments, at least one positioning element or cam 44 controls a position and/or an orientation of the at least one second magnet 18 mounted to the second element 16 and at least one other positioning element or cam controls a position and/or an orientation of the at least one first magnet 14 mounted to the first element 16.

FIG. 5 shows positioning element or cam 44 to control at least a position of the second magnets 18 mounted to the second element 16. The positioning element or cam 44 comprises an undulating or wavelike surface 46 and in particular, a surface 46 with sinusoidal surface variations comprising multiple alternately located lobes 48 and troughs 50 to move the second magnets 18 closer to the first magnets 14 when the magnets are temporarily in proximity to each other and further away from each other at other times.

The positioning element or cam 44 comprises a central aperture 52 which allows the second element 16 to be received therein. The positioning element or cam 44 is fixed below second magnets 18 such that undersides of the second magnets 18 rest on the undulating or wavelike surface 46. In this embodiment, second magnets 18 are movably mounted by any suitable means, for example, on a flexible arm or via a hinge. Hence, as the second element 16 rotates relative to the first element 12 due to the repulsive magnetic force between the first and second magnets 14, 18, the second element 16 rotates relative to the positioning element or cam 44. The second magnets 18 are moved up and down as they pass over the lobes 48 and troughs 50 of the undulating or wavelike surface 46. The periodicity of the lobes 48 and troughs 50 of the undulating or wavelike surface 46 coincides with the number and arrangement of magnets such that the second magnets 18 are moved closer to the first magnets 14 when the magnets are temporarily in proximity to each other and further away from each other at other times. Hence, the repulsive force is maximised, or at least increased due the occasions of closer proximity and any attractive force between the magnets at other times is minimised, or at least reduced.

In some embodiments, the second element 16 is in the form of a rotating disc comprising a plurality of second magnets 18. An axis of rotation of the second element or disc 16 is variable which allows the disc 16 to undulate, or wobble as the disc rotates. The variable axis of rotation allows the second magnets 18 to move closer to the first magnets 14 when the magnets 14, 18 are temporarily in proximity to each other and further away from each other at other times. This maximises the repulsive forces and minimises the attractive forces.

In some embodiments, the second element 16 comprises one or more flexible or hinged arms or levers pass over one or more raised areas via a bearing or brush to maximise the repulsive forces and minimises the attractive forces. In a variation of this embodiment, one or more pairs of arms or levers can be employed whereby when one of the pair of arms or levers is not being caused to move by the repulsion of two magnets in proximity to each other, the other arm or lever of the same pair of arms or lever is being caused to move by the repulsion of two other magnets in proximity to each other.

Figure 6:
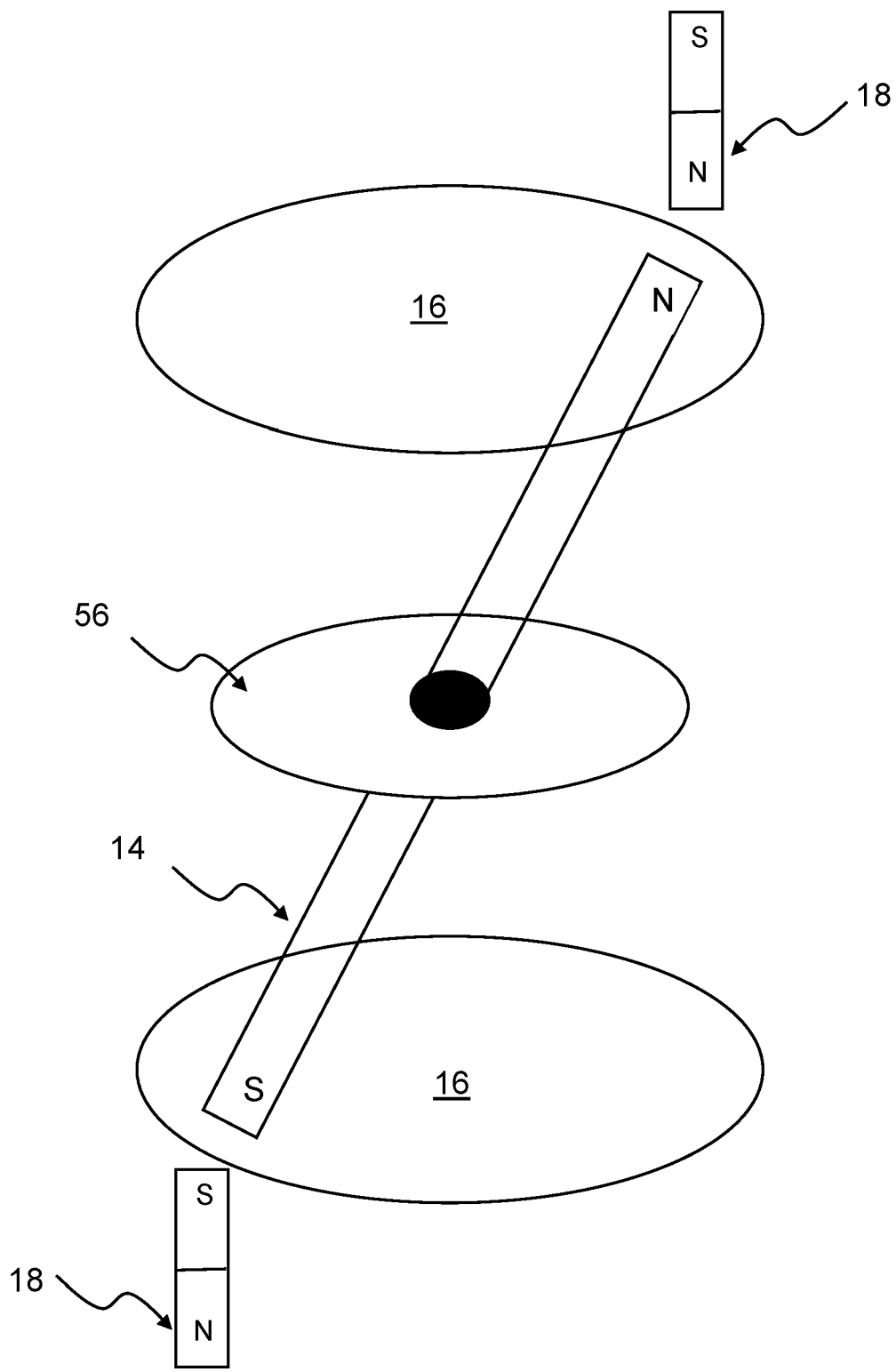
FIG. 6 is a schematic illustration of an energy generation apparatus according to some other embodiments of the present invention.

In some other embodiments, features of the embodiments described herein can be multiplied to multiply the energy generated. For example, with reference to FIG. 6, some embodiments of the energy generation apparatus comprise a pair of spaced apart second elements 16 in the form of rotating discs comprising a plurality of second magnets 18. For clarity, FIG. 6 only shows a single second magnet 18 of each disc. The energy generation apparatus comprises a central static disc 56 between the two second elements 16. At least one elongate first magnet 14 extends between the two second elements 16 at an angle through the central static disc 56 such that opposite poles of the long first magnet 14 are on opposite sides of the second elements 16. Hence, the propulsion caused by the repulsive magnetic force of two magnets in proximity to each other is duplicated in each second element.

According to another aspect, the present invention is directed to a method of energy generation comprising using the apparatus 10.

Figure 3:
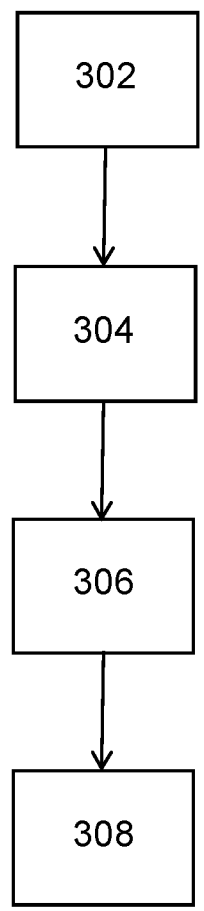
FIG. 3 is a general flow diagram illustrating methods of energy generation using the apparatus shown in FIG. 1.

According to a further aspect, and with reference to FIG. 3, the present invention is directed to a method 300 of energy generation. At 302, the method comprises mounting at least one first magnet 14 to the first element 12. At 304, the method comprises mounting at least one second magnet 18 to the second element 16, wherein the second element 16 is movable with respect to the first element 12. At 306, the method comprises orienting the at least one first magnet 14 and the at least one second magnet 18 such that common poles of the first and second magnets 14, 16, such as the north poles or the south poles, are temporarily in proximity to each other causing a repulsive magnetic force between the at least one first magnet 14 and at least one second magnet 16 to cause relative motion between the second element 16 and the first element 12. At 308, the method comprises converting kinetic energy of the moving element into electrical energy with at least one converter 28 in communication with the moving element.

Figure 4:
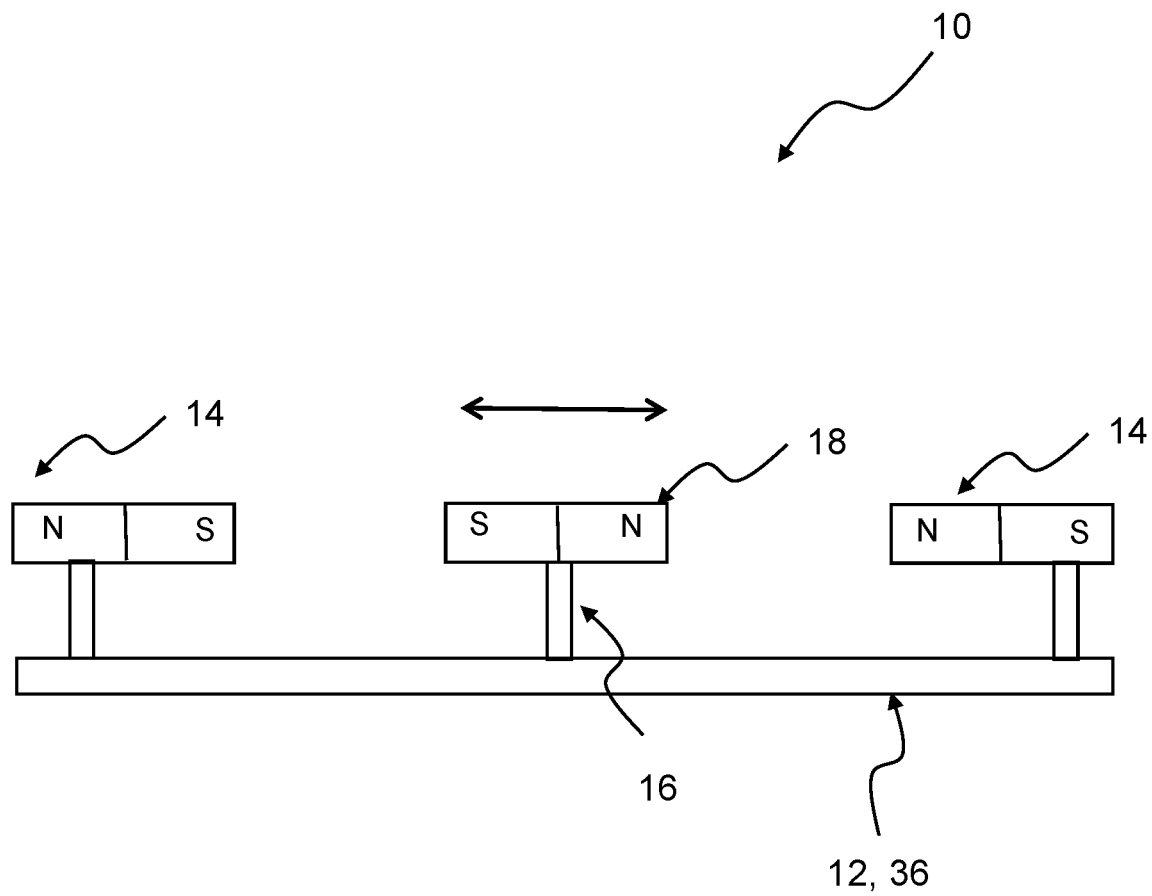
FIG. 4 is a side view of an energy generation apparatus according to other embodiments of the present invention.

It should be appreciated that the present invention is not limited to the generation of energy through rotational motion caused by magnetic repulsion. In some embodiments, the second element 16 exhibits reciprocating linear motion with respect to the first element 12 such that when common poles of the at least one first magnet 14 and the at least one second magnet 18 are temporarily in proximity to each other, the repulsive magnetic force between the common poles causes the second element 16 to move linearly with respect to the first element 12. For example, with reference to FIG. 4, first bar magnets 14 can be placed at, or towards opposite ends of the first element 12, which is in the form of a linear track 36. One of the first magnets 14 has one pole, such as the north pole facing inwards towards the track 36 and the other first magnet 14 has the opposite pole, such as the south pole respectively facing inwards towards the track 36. The second magnet 18 is mounted in a frictionless, or substantially frictionless manner to the track 36, such that the second magnet 18 can slide along the track. In this example, the north pole of the second magnet 18 faces the north pole of one of the first magnets 14 and the south pole of the second magnet 18 faces the south pole of the other one of the first magnets 14. Hence, when the second magnet 18 is set into linear motion along the track 36, for example, in the direction of the first magnet 14, when in proximity to the first magnet 14, the north pole of the second magnet 18 is repelled by the north pole of the first magnet 14 thus causing the second magnet 18 to be moved in the opposite direction back along the track 36. When in proximity to the other first magnet 14, the south pole of the second magnet 18 is repelled by the south pole of the first magnet 14 thus causing the second magnet 18 to be moved back along the track 36 in the original direction for the cycle to be repeated.

Energy can be generated from the reciprocating linear motion using the aforementioned components for energy conversion and energy storage with any suitable modifications that will be understood by the skilled addressee, but will nonetheless fall within the scope of the present invention.

Hence, embodiments of the present invention address or at least ameliorate at least some of the aforementioned problems. For example, the present invention generates kinetic energy based on the magnetic repulsion between the one or more first and second magnets 14, 18 which is converted, for example, into electrical energy, which is more environmentally considerate than many conventional methods of energy generation using fossil fuels. The present invention involves a straightforward configuration of elements, which is simpler and less costly to implement that many known renewable energy generation systems. Also, the present invention does not rely on prevailing weather conditions for the invention to operate or operate sufficiently, such as sufficient wind, rainfall, water currents or flow or sufficient solar irradiance. The present invention is also scalable according to the particular application and therefore it is envisaged that the invention can be implemented for both domestic and industrial use.

In this specification, the terms, "first", "second" etc. are intended to differentiate between different features of the present invention and are not intended to limit the present invention to a particular order of implementation unless the context indicates otherwise.

In this specification, the terms "comprises", "comprising" or similar terms are intended to mean a non-exclusive inclusion, such that an apparatus that comprises a list of elements does not include those elements solely but may well include other elements not listed.

The reference to any prior art in this specification is not, and should not be taken as, an acknowledgement or any form of suggestion that the prior art forms part of the common general knowledge.

It will be appreciated that the present invention is not limited to the specific embodiments described herein. Skilled addressees will identify variations from the specific embodiments described herein that will nonetheless fall within the scope of the present invention, which is determined by the following claims.

The invention claimed is:

1. An energy conversion apparatus comprising:
   a first element comprising at least one first magnet;
   a second element comprising at least one second magnet, the second element movable with respect to the first element; and
   at least one positioning element or cam comprising an undulating or wave-like surface to control a position and/or an orientation of the at least one first magnet and/or the at least one second magnet;
   wherein the at least one first magnet and the at least one second magnet are oriented such that common poles of the first and second magnets are temporarily in proximity to each other such that a repulsive magnetic force between the at least one first magnet and at least one second magnet causes relative motion between the first and second elements; and
   wherein the second element is in communication with at least one converter to convert the relative motion between the first element and second element into electrical energy.

2. The apparatus of claim 1, wherein the second element is rotatable with respect to the first element such that when common poles of the at least one first magnet and the at least one second magnet are temporarily in proximity to each other, the repulsive magnetic force causes the second element to rotate with respect to the first element.

3. The apparatus of claim 1, wherein the second element exhibits reciprocating linear motion with respect to the first element such that when common poles of the at least one first magnet and the at least one second magnet are temporarily in proximity to each other, the repulsive magnetic force causes the second element to move linearly with respect to the first element.

4. The apparatus of claim 1, wherein the first element comprises a plurality of first magnets and/or the second element comprises a plurality of second magnets.

5. The apparatus of claim 4, wherein the magnets of the plurality of first magnets are spaced apart on the first element, such as equal distances apart, or substantially equal distances apart, and optionally about a circumference of a circular path on the first element or a perimeter of the second element.

6. The apparatus of claim 4, wherein the magnets of the plurality of second magnets are spaced apart on the second element, such as equal distances apart, or substantially equal distances apart, and optionally about a circumference of a circular path on the second element or a perimeter of the second element.

7. The apparatus of claim 1, wherein the north poles of the at least one first magnet and the at least one second magnet are temporarily in proximity to each other, or the south poles of the at least one first magnet and the at least one second magnet are temporarily in proximity to each other.

8. The apparatus of claim 1, wherein the at least one first magnet is mounted to the first element and the at least one second magnet is mounted to the second element in an orientation to maximise the magnetic repulsive force in a direction of motion of the second element, and in particular to maximise rotational velocity of the second element.

9. The apparatus of claim 1, wherein the second element is spaced apart from the first element, in particular with an air gap between the first and second elements.

10. The apparatus of claim 9, wherein the apparatus comprises a vacuum between the first and second elements.

11. The apparatus of claim 9, wherein the first element is fixed, or the second element is mounted on at least one frictionless bearing.

12. The apparatus of claim 1, further comprising a magnetic shield element between the at least one first magnet mounted to the first element and the at least one second magnet mounted to the second element, the magnetic shield element comprising at least one aperture or opening therein at or around a location at which the at least one first magnet and the at least one second magnet is aligned.

13. The apparatus of claim 1, wherein the surface of the positioning element or cam comprises sinusoidal surface variations comprising multiple, alternately located lobes and troughs to move the second magnets closer to the first magnets when the magnets are temporarily in proximity to each other and further away from each other at other times.

14. The apparatus of claim 13, wherein a periodicity of the lobes and troughs of the undulating or wavelike surface coincides with the number and arrangement of magnets such that the second magnets are moved closer to the first magnets when the magnets are temporarily in proximity to each other and further away from each other at other times.

15. The apparatus of claim 1, wherein the positioning element or cam comprises a central aperture to receive the second element therein.

16. The apparatus of claim 1, wherein the positioning element or cam is fixed below the second magnets such that undersides of the second magnets rest on the undulating or wave-like surface.

17. The apparatus of claim 1, wherein the second magnets are movably mounted by a flexible arm, a hinge or the like such that as the second element rotates relative to the first element due to the repulsive magnetic force between the first and second magnets, the second element rotates relative to the positioning element or cam causing the second magnets to move up and down as they pass over the undulating or wavelike surface of the positioning element or cam.

18. The apparatus of claim 1, wherein an axis of rotation of the second element is variable to allow the second magnets to move closer to the first magnets when the magnets are temporarily in proximity to each other and further away from each other at other times.

19. The apparatus of claim 1, wherein the second element comprises one or more pairs of flexible or hinged arms or levers whereby when one of the pair of arms or levers is not being caused to move by the repulsion of two magnets in proximity to each other, the other arm or lever of the same pair of arms or lever is being caused to move by the repulsion of two other magnets in proximity to each other.

20. A method of energy conversion comprising using the apparatus of claim 1 to generate electricity.

21. An energy generation apparatus comprising:
  a first element comprising at least one first magnet
    a pair of spaced apart second elements in the form of rotating discs comprising a plurality of second magnets, a central static disc between the two second elements, and at least one elongate first magnet extending between the two second elements at an angle through the central static disc such that opposite poles of the elongate first magnet are on opposite sides of the second elements;
    at least one positioning element or cam comprising an undulating or wave-like surface to control a position and/or an orientation of the at least one first magnet and/or at least one of the plurality of second magnets;
  wherein the at least one first magnet and the at least one of the plurality of the second magnets are oriented such that common poles of the first and second magnets are temporarily in proximity to each other such that a repulsive magnetic force between the at least one first magnet and at least one of the plurality of second magnets causes relative motion between the first and second elements.

22. A method of energy conversion comprising:
  mounting at least one first magnet to a first element;
  mounting at least one second magnet to a second element, wherein the second element is movable with respect to the first element;
  orienting the at least one first magnet and the at least one second magnet such that common poles of the first and second magnets are temporarily in proximity to each other causing a repulsive magnetic force between the at least one first magnet and at least one second magnet to cause relative motion between the first and second elements;
  controlling a position and an orientation of the at least one first magnet and/or the at least one second magnet with at least one positioning element or cam comprising an undulating or wave-like surface; and
converting kinetic energy of the moving first and/or second element into electrical energy with at least one converter.

* * * * *